(No Model.)
D. SMITH.
ICE VELOCIPEDE.
No. 500,623. Patented July 4, 1893.
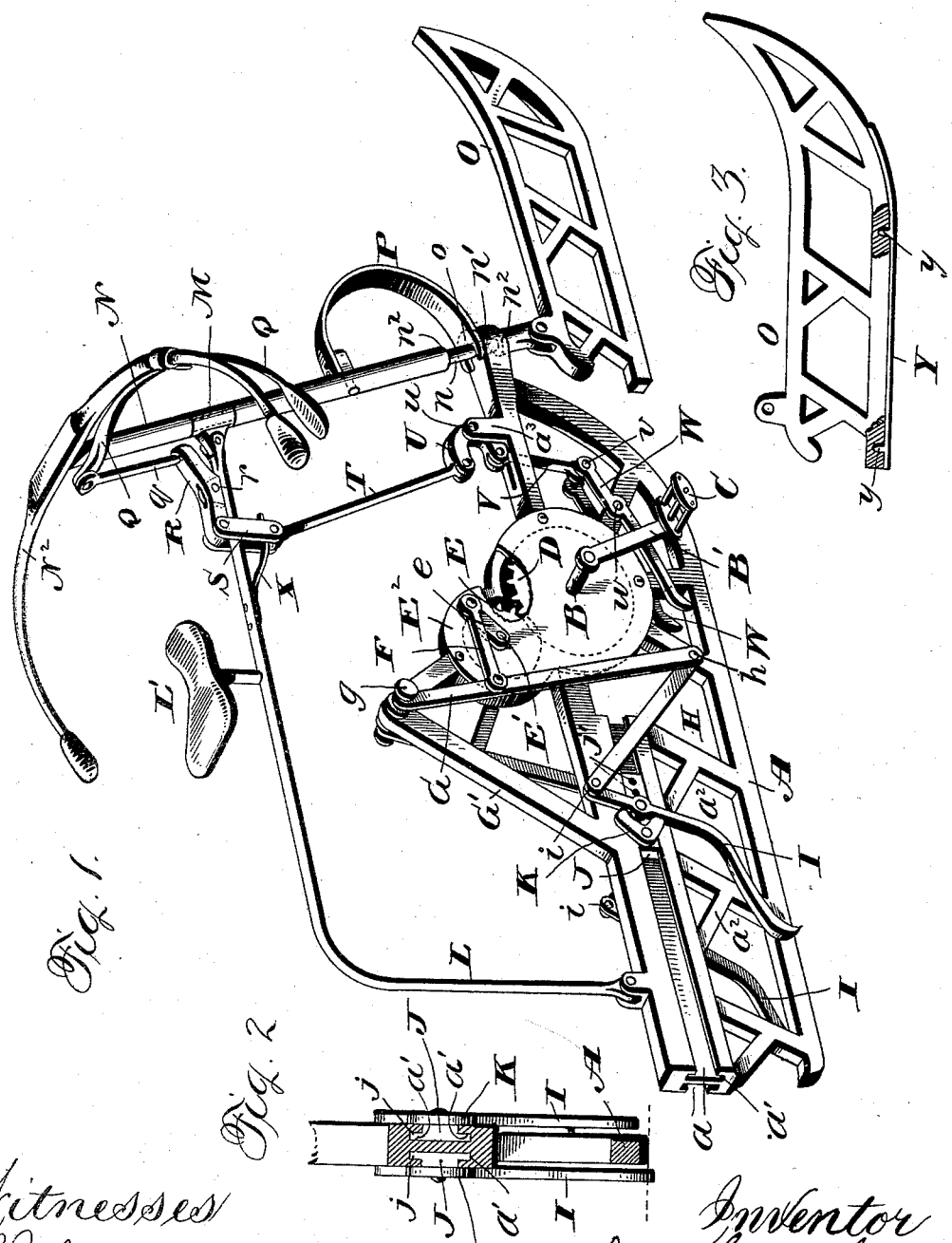

UNITED STATES PATENT OFFICE.

DEL SMITH, OF WORCESTER, NEW YORK.

ICE-VELOCIPEDE.

SPECIFICATION forming part of Letters Patent No. 500,623, dated July 4, 1893.

Application filed February 10, 1893. Serial No. 461,830. (No model.)

*To all whom it may concern:*

Be it known that I, DEL SMITH, a citizen of the United States, residing at Worcester, in the county of Otsego and State of New York, have invented certain new and useful Improvements in Ice-Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in vehicles designed to travel upon ice or snow, and it has for its objects among others to provide a simple and durable machine or sled which may be termed an ice velocipede, so constructed that it can be made to travel with great velocity upon the ice, being propelled by the feet of the rider acting upon pedals which are arranged to move the sleigh forward by novel mechanisms acting upon the ice in the nature of pushers. Suitable means are provided for steering the machine, as well as for stopping the same when desired. The steering runner is connected with the steering rod by a hinge joint or connection so that it may readily mount elevations or ride down inclines without danger of breaking the runner or its connection with the said steering rod.

I provide a main runner with a pedal shaft carrying the pedals and cranks and on this shaft within a suitable housing is a gear wheel which is designed to mesh with a smaller gear wheel also within a suitable housing, and on the shaft of the smaller gear wheel are cranks and on the ends of these crank arms are links which are attached to swinging arms which are pivotally connected with slides that move in suitable horizontal ways at the rear of the runner and which slides carry the pushers by which the vehicle is propelled. The steering rod is mounted to revolve in suitable bearings at the front end of the machine and a spring is provided to permit of sufficient movement to take up all jars and shocks occasioned by going over rough or uneven ice or snow. The brake mechanism is mounted to be operated by a lever on the handle bar and within convenient reach of the rider.

The device as a whole is simple in its construction, durable, easily operated and capable of developing great speed with the minimum power.

Other objects and advantages of the invention will hereinafter appear and the novel features thereof will be specifically defined by the appended claims.

The invention in the present instance resides in the peculiar combinations, and the construction, arrangement and adaptation of parts whereby the desired ends are accomplished in the most approved manner, all as more fully hereinafter described, shown in the drawings and then particularly pointed out in the claims.

The invention is clearly illustrated in the accompanying drawings, which, with the letters of reference marked thereon, form a part of this specification and in which—

Figure 1 is a perspective view of my improved ice velocipede. Fig. 2 is a section through the runner showing the guide-way therein and the slide fitted thereto. Fig. 3, is a side view of the front runner, showing the supplemental shoe.

Like letters of reference indicate like parts throughout the several views.

Referring now to the details of the drawings by letter, A designates the main runner of the machine which may be of any well known or approved construction except as hereinafter specified. Near its rear end it is provided with the longitudinal guide ways $a$ which may be dovetailed or undercut as seen to provide the channels or grooves $a'$ for the reception of the projections or extensions on the slides which are adapted to slide therein. Suitable braces as $a^2$ should be provided at this point to brace the guides as considerable strain occurs at this point.

B is a transverse shaft the ends of which carry the cranks B' on which are mounted the pedals C of any well known or approved form of construction. On this shaft is a gear wheel D which meshes with a smaller gear wheel E carried by the shaft E' journaled above and a little to the rear of the shaft B as shown, the two shafts being journaled in bearings in the walls of the casing or housing $E^2$ which is detachably secured to the frame work on the runner in any suitable manner so that the gears may be gotten at if desired for the purpose of repairs or for other purposes. Suitable provisions should be made for oiling the parts when necessary. The shaft E' carries at its ends which extend beyond the casing the oppositely disposed crank arms $e$ to the free ends of which are pivotally connected the links F which are in turn pivotally connected with the arms G which are pivoted at their upper ends on a pivot $g$ held at the apex of the brace arms G' and the said arms which are thus mounted to swing on the said pivot are pivotally connected as at $h$ with the inclined arms H which are pivoted at $i$ to the upper ends of the pushers I which are pivotally connected between their ends with the slides J which are mounted to slide in the ways on the runner and are provided with extensions or ribs $j$ working in the grooves or channels of the said ways as seen in Fig. 3. The pushers have their lower ends sharpened as shown and are designed to dig into the ice or snow as they are moved along in the guide ways. The connection between the pushers and the slides is made adjustable in any suitable manner as by a plurality of holes $j'$ in the slide into any one of which the pivot pin may be engaged to adjust the leverage when occasion may require.

On the slides to the rear of the pivots of the pushers are pivotally mounted the bell crank levers or arms K which are designed to act upon the pushers and by reason of their weight or pressure thereon aid them in their movements as will be readily understood from Figs. 1 and 2. They also serve to stop or limit the rotary motion of the arms I.

From the above it will be readily understood how motion is given to the machine; the rider operates the pedals with his feet in just the same manner as upon a bicycle on the ground; this gives motion to the large gear which in turn revolves the smaller gear and this operates the crank arms on the shaft of the said smaller gear and this, through the medium of the devices above described, forces the slides back and forth in their guide-ways and thereby causes the pushers to alternately move backward and digging into the ice force the machine forward; great speed can be attained by rapid movement of the pedals.

L is a bar or rod having the lower end of its vertical portion connected with the upper face of the runner near the rear and its horizontal portion is arranged at the proper height to form a support for the seat L' at the proper height for the rider; the forward end of the horizontal portion of this bar or rod has hinged thereto a casting or socket M which forms a bearing for the steering rod N which is mounted to turn therein. The steering rod may be made in sections for more easy placing of it in its bearings. This steering rod is also journaled in another bearing $n'$ supported on the front end of the runner as shown and to the lower end of this steering rod there is connected the steering runner O of any suitable construction and the connection between the steering rod and this runner is such that the runner can turn in all directions; it is preferably joint constructed to permit free movement of the runner in a vertical plane, the other necessary movements being obtained by the steering rod being journaled to revolve in its bearings. To the upper end of the steering rod is attached the handle bar $N^2$ in any suitable manner. At the lower bearing of the steering rod the same is formed with a reduced portion $n$ forming the shoulders $n^2$ and supported upon the steering rod at a point above the lower bearing is a spring P of flat metal and having its lower end formed as seen at $o$ to embrace the steering rod and bear upon the upper face of the said lower bearing in such a manner as to keep the same down upon the lower shoulder of the reduced portion of the steering rod but when passing over obstructions or uneven ice which would ordinarily cause a sudden shock or jar the spring will allow the bearing to yield with the obstruction and thus take off the jar.

To the under side of the handle bar is pivoted the brake lever Q of any suitable form and the end of this lever opposite the handle part to be grasped by the rider when he desires to apply the brake is a pin or arm $q$ which is designed to engage in a hole in the end of the lever R pivoted at $r$ to the horizontal portion of the bar or rod L near its front end as shown and to the other end of this lever are pivotally connected links S which at their lower ends are pivotally connected with the vertical rod or arm T, the lower end of which is pivotally connected with the end of the upper horizontal arm of the bell crank lever U which is pivoted as at $u$ on an upright $a^3$ of the runner near the front end thereof and the free end of its lower horizontal arm is pivotally connected with the rod or link V which at its lower end is pivotally connected with a horizontal pin or rod $v$ connecting the brake arms W which are pivoted between their ends as at $w$ on one of the braces of the main runner and which have their lower and acting ends sharpened as shown to dig into the ice. It will be readily understood how by throwing the brake arms down so that their sharpened ends engage the ice the machine will be stopped. A flat spring X secured at one end to the under side of the horizontal portion of the rod or bar L and bearing upon the pivot of the links S and rod T serves to normally keep the brake in a position not to touch the ground, but permits of its ready actuation when desired.

The front or guide runner may be provided with a supplemental runner Y for use upon unusually smooth ice; it may be held in place in any suitable manner; I have shown it as provided at each end with an upwardly-extending prong $y$ designed to fit holes in the under face of the runner. This may be carried on the machine and easily and quickly applied at such times as its need is apparent.

Modifications in detail may be resorted to without departing from the spirit of the invention or sacrificing any of its advantages.

What I claim as new is—

1. The combination with the main runner and the steering rod having a reduced portion, of a spring on the rod and bearing upon the forward end of the rear runner above the lower bearing of the rod on the runner, as set forth.

2. The combination with the main runner and its operating mechanism, of the steering rod mounted to rotate in a bearing on the runner, and provided with reduced portion and shoulders, of the spring on the rod having one end bearing on the lower bearing of the rod around the reduced portion, as set forth.

3. The combination with the main runner with guide-ways, of the slides movable in the ways, the pushers pivoted on the slides, the pedals, the gears and pivotal connections between the gears and slides, substantially as specified.

4. The combination with the slides and the gears, of the means for operating the gears, the cranks on the shaft of one of the gears, and the pivotal connections between the said cranks and the slides, as set forth.

5. The combination with the main runner and the slides carrying the pushers, of the pedals and operating means for the slides, the brake and the steering runner, all as set forth.

6. The combination with the main runner and the brake mechanism, of the spring for holding the brake in an inoperative position, as set forth.

7. The combination with the main runner and its operating means, of the steering runner and the steering rod, and the brake mechanism embodying sharpened rods to engage the ice, substantially as specified.

8. The combination with the main runner, of the bar secured at one end to the rear thereof and at the other end carrying a bearing for the steering rod, as set forth.

9. The combination with the main runner and the steering rod, of the bar secured at one end to the rear of the runner and at its other end carrying a bearing for the steering rod, and a seat secured to the horizontal portion of said bar, substantially as specified.

10. The combination with the main runner and its operating devices, of the brake mechanism, and the steering runner and rod, and a spring mounted on the said rod and adapted to bear down upon the front end of the main runner, substantially as and for the purpose specified.

11. The combination with the main runner and the steering rod having reduced portion and shoulders, of the curved spring having one end secured to the rod and the other end formed with an opening to embrace the rod at the reduced portion and bear upon the runner, substantially as specified.

In testimony whereof I affix my signature in presence of two witnesses.

DEL SMITH.

Witnesses:
WATSON C. SMITH,
LA RUE PIERCE.